United States Patent [19]

Zdansky

[11] 4,277,337

[45] Jul. 7, 1981

[54] DEPOSIT FILTERING APPARATUS FOR FILTERING TURBID LIQUIDS

[75] Inventor: Ewald Zdansky, Vaduz, Liechtenstein

[73] Assignee: Hoval Interliz AG, Vaduz-Neugut, Liechtenstein

[21] Appl. No.: 157,436

[22] Filed: Jun. 9, 1980

[30] Foreign Application Priority Data

Jun. 7, 1979 [DE] Fed. Rep. of Germany ....... 2923010

[51] Int. Cl.³ .............................................. B01D 37/02
[52] U.S. Cl. ................................... 210/173; 210/193; 210/232; 210/333.01; 210/410
[58] Field of Search ............... 210/777, 778, 798, 173, 210/174, 193, 232, 253, 332, 333.01, 340, 341, 410

[56] References Cited

U.S. PATENT DOCUMENTS

| 1,642,673 | 9/1927 | Genten | 210/798 |
|---|---|---|---|
| 2,055,869 | 9/1936 | Manning | 210/778 |
| 3,019,184 | 1/1962 | Brown | 210/777 |
| 3,037,635 | 6/1962 | Boorwjy | 210/778 |
| 3,050,192 | 8/1962 | Beutler | 210/778 |
| 3,280,978 | 10/1966 | Scott | 210/798 |
| 3,666,097 | 5/1972 | Ryan | 210/798 |
| 3,669,267 | 6/1972 | Hutton | 210/777 |
| 4,201,670 | 5/1980 | Baur | 210/778 |

Primary Examiner—Ernest G. Therkorn
Attorney, Agent, or Firm—Becker & Becker, Inc.

[57] ABSTRACT

A deposit filtering apparatus and method for filtering turbid liquids. The apparatus is provided with an essentially cylindrical, vertical filter container, in which sieve-like plate-shaped filter elements are arranged vertically between the turbid liquid chamber and a filtrate chamber of the filter container. That side of the filter element facing the turbid liquid chamber is covered with a detachable filter membrane formed by depositing thereon a suspension agent aiding the filtering process. The turbid liquid chamber is connected to a turbid liquid conduit for supplying the turbid liquid, and the filtrate chamber is connected to a filtrate conduit for discharge of the filtered liquid. The bottom of the filter container has a closeable opening for removal of the filter cake, consisting of filtering aid agent and impurities, separated or detached from the filter elements. A filter element packet, which is closed on the four vertical sides thereof, is arranged as a removable unit in the filter container.

9 Claims, 4 Drawing Figures

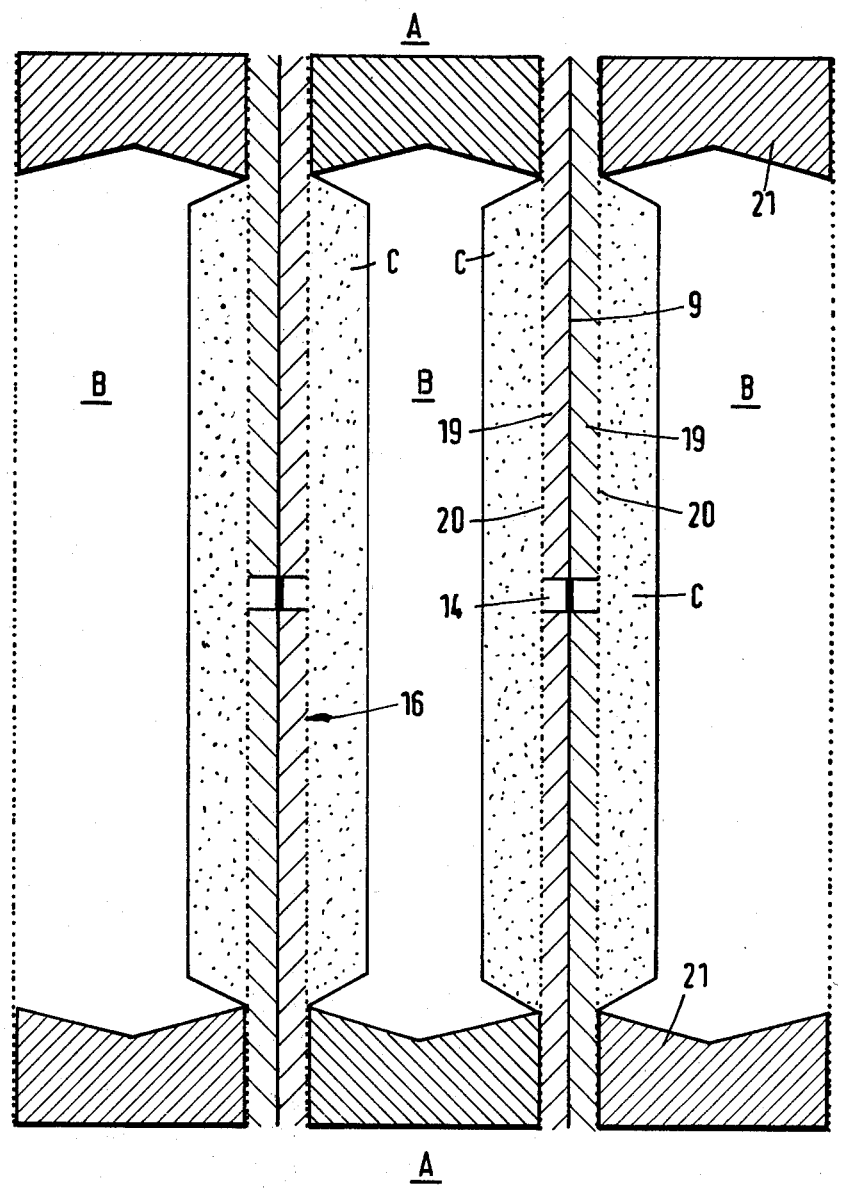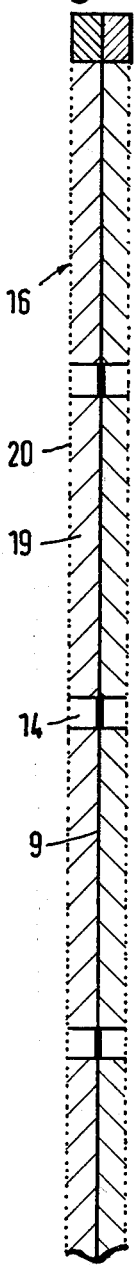

DEPOSIT FILTERING APPARATUS FOR FILTERING TURBID LIQUIDS

The present invention relates to a matting or deposit filtering apparatus for filtering turbid liquids, and is provided with an essentially cylindrical, vertical filter container, in which sieve-like plate-shaped filter elements are arranged vertically between a turbid liquid chamber and a filtrate chamber of the filter container. That side of the filter elements facing the turbid liquid chamber is covered with a detachable filter membrane formed by depositing thereon a suspension agent aiding the filtering process. The turbid liquid chamber is connected to a turbid liquid conduit for supplying the turbid liquid, and the filtrate chamber is connected to a filtrate conduit for discharge of the filtered liquid. The bottom of the filter container has a closable opening for removal of the filter cake, consisting of filtering aid agent and impurities, separated or detached from the filter elements. The present disclosure relates to a method for carrying out a filtering process with such a deposit filtering apparatus.

With the known depositing filtering devices used for filtering turbid liquids, there are arranged in the usually cylindrical and vertical filter container, which in most cases has a conically extending bottom with closable opening, individual vertical filter element plates. As a rule, these plates comprise a coarser core fabric and a finer mesh cover fabric on both sides, and all four sides are enclosed by a pipe frame which on its lower side is connected to a filtrate-collecting pipe located below the filter elements. Those surfaces of the filter elements which face the turbid liquid chamber of the filter container are, by matting or depositing a filtering aid agent thereon suspended in a liquid, covered with a necessary, detachable or dissolvable and periodically to be renewed filter membrane from the filter aiding agent. It is known to create these filter membranes in such a manner that, in a separate preparatory container which is in communication with the filter container, there is prepared manually a fiber suspension of water and loose fiber flakes dispersed in the water. It is further known that, prior to the actual filtering of a turbid or murky liquid, this fiber suspension is pumped so long against the turbid side of the filter elements, and clear water is discharged from the filtrate side of the filtering elements, until, by continuous pumping-in of the suspension and gradual separation of the fiber materials, the filter membrane has reached the necessary layer thickness. In order to attain a necessarily as uniform as possible fiber separation upon large-surface filter elements, this depositing or matting method, designated as a dynamic method, could only be carried out with a relatively small fiber concentration in the continuously pumped-in suspension, and with a relatively small flow velocity of the suspension, and for this reason was too time consuming in practice. For this reason, the utilization of fiber material for the filter membrane formation was abandoned for the operation of modern depositing or matting filter apparatus, and the filtering method was converted to kieselguhr or diatomaceous earth (diatomite) as an easy-to-handle, economical filtering aid agent. When using kieselguhr, first a thin kieselguhr layer is deposited on the filter elements by means of water or filtrated liquid. After this preliminary depositing, beginning with the filtering process, the turbid liquid, to which continuously further kieselguhr quantities are added, is supplied. Consequently, the pre-deposited initially thin kieselguhr layer is, during the filtration, concentrated into a thicker filter cake containing the impurities removed from the turbid liquid. After every filtering period, the saturated filter cake must be removed from the filter container. For this purpose, it is known to push or knock off the filter cake from the filter elements by a mixture of compressed air and water, which is brought from the filtrate chamber side against the backside of the filter cake. The cake comes into the conical container bottom as a thick slurry, and is withdrawn from there.

According to another method, it is known to detach the filter cake by vibrations caused by a vibrator arranged on the filter elements, and to let the broken up and half dry filter cake drop into the conical container bottom. The detaching and removing of the filter cake is an essential procedure with deposit filtering, and causes considerable problems with both aforementioned methods. The filtrate-collecting pipe lying transversely below the filter elements with the known filter containers represents an obstacle and makes difficult a complete removal of the cake mass. In any event, after accomplishing removal of the filter cake, there must be carried out a thorough post-cleaning, especially of the filter elements. The fine-granular kieselguhr tends to penetrate into the fabric pores of the filter elements, thus leading to blockage or clogging, which requires the thorough post-cleaning of the filter elements after every filtering period. Additionally, the kieselguhr matting requires an especially dense weave or texture of the fabric on the turbid side of the filter elements, since otherwise the kieselguhr layer formation upon the filter elements will occur only very slowly or not at all. The utilization of kieselguhr for predepositing thus proved very disadvantageous from an industrial processing standpoint, especially also because the thorough post-cleaning of the filter elements requires a considerable amount of rinsing water and is also time-consuming, costly, and cumbersome. Additionally, the waste water contamination connected with the post-cleaning is no longer justifiable or permissible.

The object of the present invention is to avoid the indicated disadvantages and difficulties of the known depositing or matting filtering apparatus and of the known methods or procedures using such apparatus.

This object, and other objects and advantages of the present invention, will appear more clearly from the following description in conjunction with the accompanying drawings, in which:

FIG. 1 schematically illustrates the entire depositing or settling filtering apparatus;

FIG. 2 is a horizontal section through a portion of the filter element packet contained in the filter container of the apparatus of FIG. 1;

FIG. 3 is a vertical section through a filter element of FIG. 2; and

Figure 1:
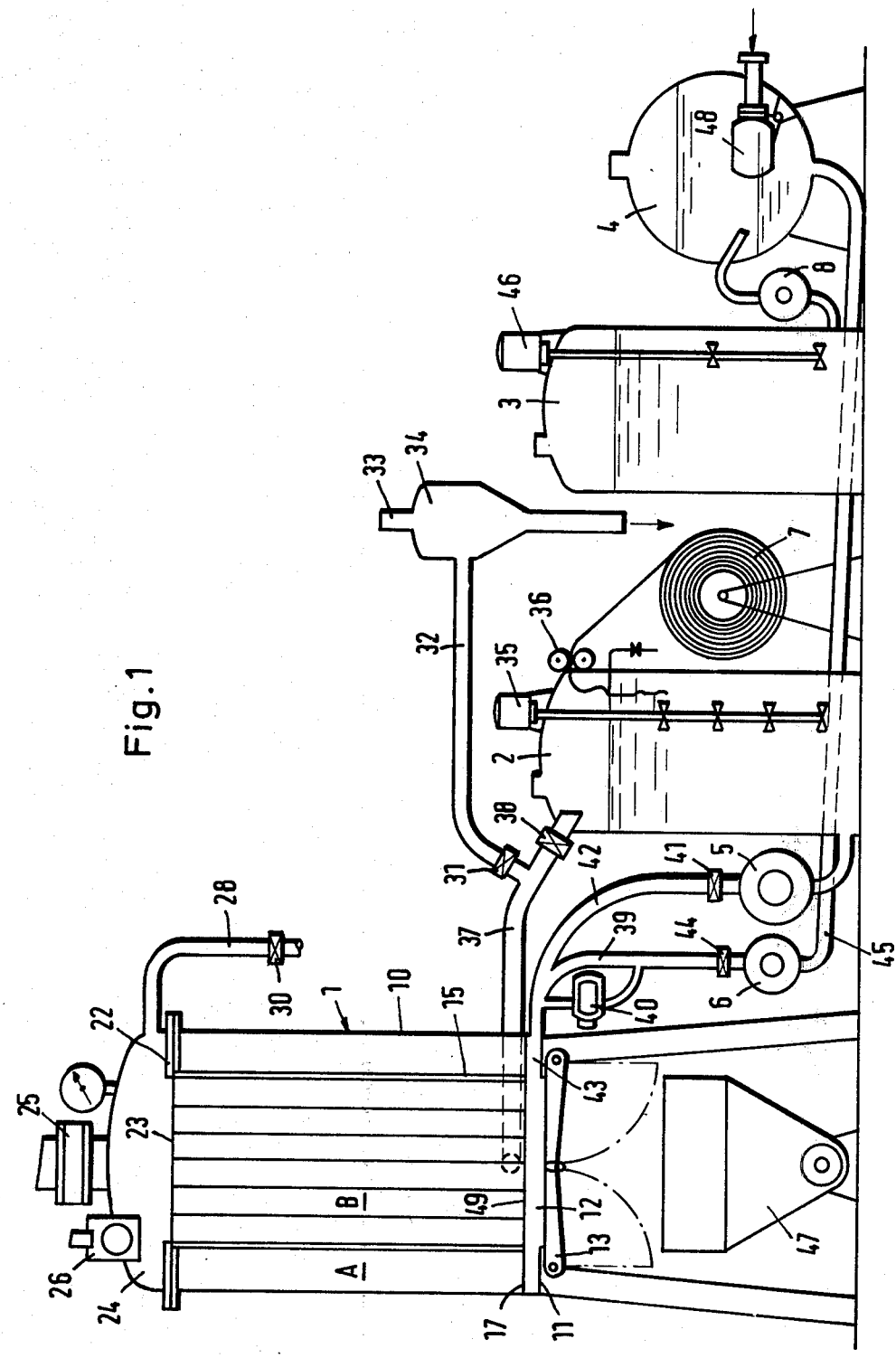
Figure 4:
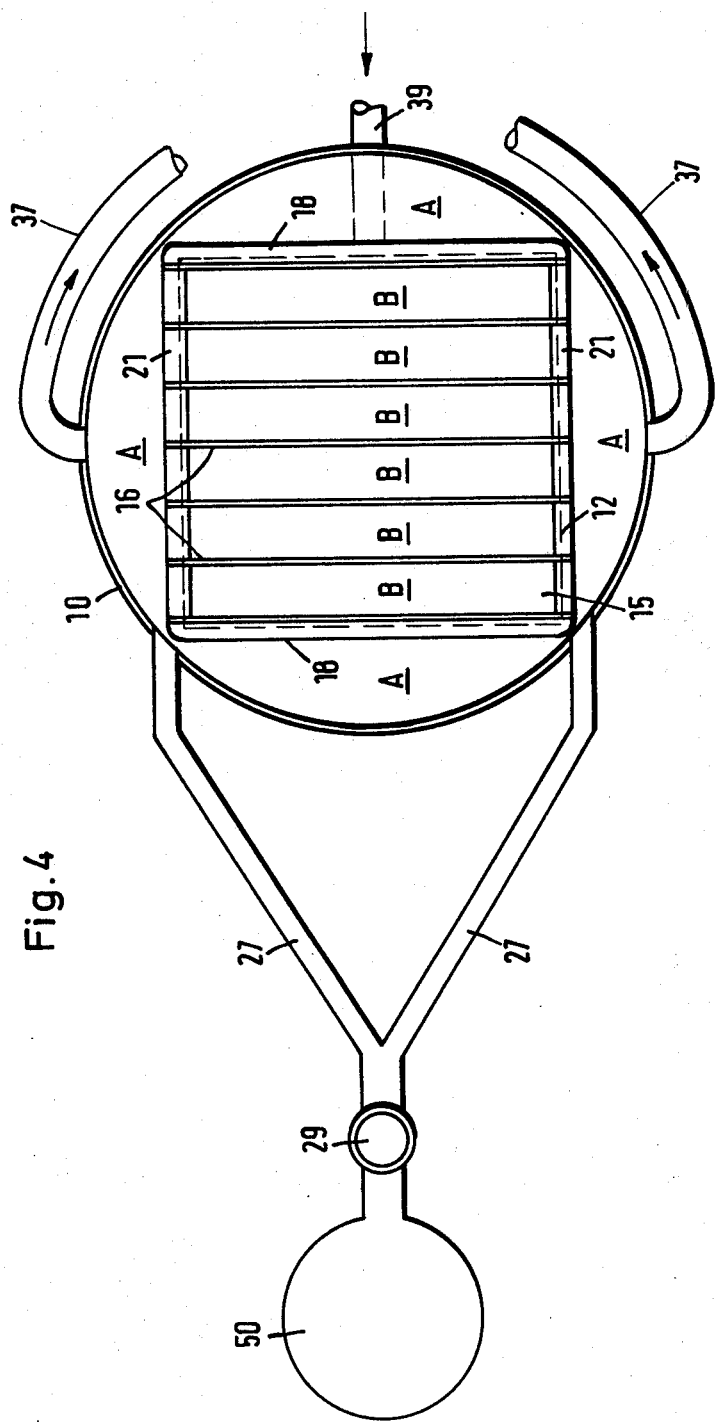
FIG. 4 illustrates the filter container of the filtering apparatus of FIG. 1 in a horizontal section with schematically represented connected compressed air devices for detaching the filter cakes.

The filtering apparatus itself is characterized primarily in that:

(a) A filter element packet, which is closed on the four vertical sides thereof, is arranged as a removable unit in the filter container; the filter element packet is tightly connected with the filter container along the upper and lower edges by way of an intermediate cover and an intermediate bottom, so that between the intermediate cover and the intermediate bottom, the filtrate chamber surrounding the vertical packet sides is separated from the remaining container inner space connected with the turbid liquid conduit;

(b) the vertical filter elements of the packet are arranged in a plane parallel spacing with respect to each other and form turbid liquid chambers with their intermediate chambers; these turbid liquid chambers are open toward the top and bottom and are tightly closed relative to the filtrate chamber by vertical spacer strips between the vertical edges of the filter elements;

(c) the upper and lower horizontal faces of the filter elements are tightly closed, while the vertical faces of the filter elements are open to the filtrate chamber between the spacer strips; and (d) the filter container, below the filter element packet, has a flat container bottom with a quadratic bottom opening, the cross section of which corresponds to the entire cross section of the filter element packet and which is tightly closable by the suitably large bottom flap.

This embodiment of the filter container has the decisive advantage that, after termination of a filtering period, all filter cakes formed on the filter elements can be pushed or knocked off from the turbid liquid sides of the filter elements by vibration or, in a preferred manner, by compressed air rebound coming from the filtrate side of the filter elements, and that with an opened bottom flap the cakes can directly or without any impediment drop downwardly from the filter container as complete, unbroken cakes. The cake detachment can be carried out especially exactly and cleanly when the filter membranes comprise a pre-deposited thin blocking layer of a fiber material, and a kieselguhr layer continously deposited during the turbid liquid filtering. In this case, the filter cakes hold especially well together during the pushing-off or knocking-off from the filter elements, and leave absolutely clean filter element surfaces, so that a post-cleaning with rinsing water is entirely superfluous. For the purpose of improving and making more uniform the detaching of the filter cakes when utilizing an air pressure in the filtrate chamber of the filter container for pushing or knocking-off the filter cakes from the filter elements, according to a further advantageous embodiment, the filter elements are subdivided into two fabric layers by a central closed plate, and the fabric layers in turn are subdivided by several embedded horizontal separating strips, and possibly further by central vertical separating strips, into several partial fields which are open along the faces of the filter elements and are in communication with the filtrate chamber.

It was found that a simultaneous detaching of the entire filter cake plates and a dropping of the filter cakes from the opened bottom flap as an unbroken piece is attainable in an especially reliable manner with the use of the knock-off method by pressurized air, when a sufficiently high pressure cushion can be built up so quickly and can be maintained for such a brief period of time on the filtrate side of the filter elements that it becomes effective collectively and as an impulse before the detachment of the cakes from the filter elements begins, which is somewhat delayed by inertia and adhesion. It was further found that the pressure cushion needs to have only a pressure level of from 0.1 to 0.2 bar in order to effect the simultaneous throwing-off of all filter cakes from all filter elements, and that this pressure is sufficient when it can be accomplished to build-up the pressure within approximately from 0.03 to 0.05 seconds. For this purpose, according to a further advantageous embodiment, the filtrate chamber of the filter container, by means of blockable compressed air conduits, is connected to a compressed air supply container, the air volume and air pressure of which are so great that upon shock-like relief of the compressed air into the filtrate chamber, with empty filter container and open bottom flap, an air presssure occurs in the filtrate chamber and in the fabric layers of the filter elements which is sufficient to knock-off the filter cakes from the filter elements in the turbid liquid chambers, this air pressure preferably being from 0.1 to 0.2 bar. In a further embodiment, the volume of the compressed air supply container can be approximately 10% of the volume of the filtrate chamber; the air pressure in the compressed air supply container before the relieving of the compressed air into the filtrate chamber can be approximately 10 bar; and the compressed air conduit can be provided with a valve embodied with an opening time of approximately from 0.02 to 0.03 seconds.

For the production of a fiber suspension for the predepositing of a thin fiber layer upon the turbid side of the filter elements, according to a further advantageous embodiment of the invention, the turbid liquid chamber of the filter container is connected with a preparation container by a conduit; this container has a paper supply roll and a stirring device with knife-like sharp stirring blades for tearing up the introduced paper web. In this way, the cumbersome manual stirring-in of loose fiber flakes into the water is avoided, and the preparation of a fiber suspension for predepositing a thin fiber layer can thus be mechanized by drawing sections of the paper web into the preparation container and tearing up the drawn-in paper web, and can be automated in connection with the filtering process and the filter membrane exchange.

The novel filtering method carried out with the inventive depositing or matting filtering apparatus is characterized primarily in that the turbid liquid chamber of the filter container is filled with a fiber suspension formed of clean liquid, which essentially contains the entire fiber quantity necessary for the depositing of a thin blocking layer from the fiber material; with the filtrate conduit being closed and the filter container being vented, the filtrate chamber then is filled with clean liquid. After complete filling of the turbid liquid chamber with the fiber suspension, the filtrate conduit is opened and the liquid is quickly discharged through the filtrate chamber. The entire fiber quantity accordingly is deposited onto the filter elements at a certain quiet current or flow in the turbid liquid chamber. With this depositing method, which can be designated as static, there is attained a very uniform depositing of the fiber material upon the entire surface of the filter elements. The fiber suspension can contain a high fiber concentration, and since the water of the fiber suspension can be discharged very quickly from the filter container, the predepositing of the thin blocking layer of fiber material can occur in a very short time, and as a result there can very quickly be started a satisfactory clean filtering of a turbid liquid with further added kieselguhr. For the purpose of subsequently still making the predeposited blocking layer of fiber material denser and accordingly improving the bonding of the filter membrane to the filter elements, clear liquid can be pumped in a circuit through the turbid liquid chamber and the filtrate chamber after or already during the quick discharge of the liquid of the fiber suspension from the filtrate chamber of the filter container. The thickness of the predeposited blocking layer of fiber material can be determined by variation of the concentration of the fiber suspension. The static depositing method is also capable of being carried out with large filter element surfaces of for example from 10 to 20 m² within approximately 2 to 3 minutes. For incorporating the production of a predeposited thin blocking layer of fiber material, without any manual action being needed, in an operationally secure manner in the filtration process, the fiber suspension is not prepared from loose fiber flakes that are cumbersone to handle, but rather a suitable filter paper is advantageously used as the fiber material. This filter paper is available as a large paper roll, and is sufficient for a large number of filter membrane exchanges. Between two filter membrane exchanges, within the framework of an automatic control of the entire filtering apparatus and of the filtration operation, there can be produced and kept ready the fiber suspension needed for the next filter membrane exchange; this is accomplished by introducing a predetermined length of paper web into a preparation container filled with a clear liquid, by tearing up the introduced length of paper web by means of sharp blades of a stirring mechanism.

The depositing of a thin blocking layer of fiber material, which is undertaken prior to filtration of a turbid liquid and with continuously added kieselguhr, precludes engagement of the kieselguhr with the base fabric of the filter elements; this also avoids the danger of a clogging or blocking of the filter elements, and assures a clean separating or detaching of the filter cakes from the filter elements. The detaching of the filter cakes can occur by vibration or by compressed air. With the compressed air detaching, the filter container can be subjected to air pressure after withdrawal of the remaining quantities of turbid liquid and filtered liquid; then the bottom flap which completely opens the turbid liquid chamber downwardly can be opened suddenly, whereby the pressure cushion which is relieved from the filtrate chamber into the turbid liquid chamber presses the filter cakes from the filter elements. The pressed-off filter cakes, which collide against each other at those turbid sides of the filter elements located across from each other drop downwardly out of the turbid liquid chambers through the completely opened bottom opening and out of the filter container.

Advantageously, in a further embodiment of the inventive filtering method, the compressed air relieving occurs in such a manner that, for the purpose of knocking-off the filter cakes from the filter elements, the bottom flap of the filter container is opened, and that by a shock or impact-like introduction of compressed air into the filtrate chamber for a duration of approximately from 0.03 to 0.05 seconds, there is generated in the filtrate chamber an air overpressure of 0.1 to 0.2 bar. This brief and relatively small air cushion is sufficient for knocking-off the filter cakes, and avoids that in the turbid liquid chamber an increased air flow due to an unnecessary flowing-in of air from the filtrate chamber prevails, whereby the detached and downwardly dropping filter cakes would be broken into pieces. Advantageously, the air relieving itself into the turbid liquid chamber is discharged not only through the opened bottom flap, but rather the air is additionally discharged upwardly through a relief valve opening, for example automatically, when the filter container is empty, whereby the discharge velocity of the air from the turbid liquid chamber is still further reduced.

Referring now to the drawings in detail, the depositing-filtering apparatus essentially contains the actual depositing filter 1 with a filter-cake-catching container 47 arranged therebelow, a preparation container 2 for the production of a fiber suspension, a kieselguhr container 3, and a buffer container 4 for the turbid liquid. From the preparation container 2, a suspension conduit 42 with a depositing pump 5 and a depositing valve 41 leads to the turbid liquid chambers B of the depositing filter 1. A filtrate conduit 37 leads from the filtrate chambers A of the depositing filter 1 back to the preparation container 2 by way of a return valve 38. The turbid liquid to be filtered flows into the buffer container 4 by way of a float valve 48. A kieselguhr suspension is prepared by means of a stirring mechanism 46 in the kieselguhr container 3, and this kieselguhr suspension is supplied by means of a dosing pump 8 to the turbid liquid to be filtered in the buffer container 4. A conduit 45 leads from the buffer container 4 to an operating pump 6, from which a conduit 39, for turbid liquid, with a turbid liquid valve 44 capable of being actuated by a float switch 40, likewise leads to the turbid liquid chambers B of the depositing filter 1 by way of a distributing pre-chamber 43. A conduit 32 with a filtrate valve 31 is connected to the filtrate conduit 37, before the return valve 38, for discharging the filtered liquid; the conduit 32 leads to a separator 34. The filtered liquid flows downwardly from the separator 34 into a collecting container (not illustrated). Toward the top, the separator 34 has an air-withdrawing pipe 33.

The depositing filter 1 comprises a vertical cylindrical filter container 10 which is closed at the top by a removable container hood 24. On the container hood 24 is located a float valve 26, with which the filter container 10 is vented when it is being filled with liquid, and a relief valve 25 which is actuated during the filter cake detachment. A compressed air pipe 28 with a compressed air valve 30 is connected to the filter container 10, and in particular to the turbid liquid chambers B thereof.

A filter element packet 15 is arranged in the filter container 10, and this packet 15 comprises several vertical and plane parallel plate-like filter elements 16 which are so combined with each other that the filter element packet can be installed as a unit into the filter container 10, or can be removed therefrom as a unit. The filter elements 16 form between themselves the turbid liquid chambers B which are open at the upper side 23 of the filter element packet 15, and likewise are open with the entire cross section at the underside 49 of the filter element packet 15 toward the container bottom 11. At the upper edge and at the lower edge, the filter element packet 15 is tightly connected with the filter container 10 by a sealingly engaging intermediate cover 22 and an intermediate bottom 17. Between the intermediate cover 22 and the intermediate bottom 17 there is located the filtrate chamber A, which surrounds the four vertical sides of the filter element packet 15 and is separated from the container chambers, fillable with turbid liquid, above the upper side 23 and below the underside 49 of the filter element packet 15. The filter element packet 15 is closed by end plates 18 at two oppositely located packet sides. The turbid liquid chambers B are tightly closed by spacer strips 21 at the two vertical packet sides, and these strips 21 are arranged between the vertical edges of the filter elements 16. The filter elements 16 comprise a woven metal fabric 19, and are tightly closed at their upper and lower horizontal edge surfaces, i.e. along the upper side 23 and along the underside 49 of the filter element packet 15, as shown in FIG. 3. The filter elements 16 are open toward the filtrate chambers A at the vertical edge surfaces lying between the spacer strips 21. The flat container bottom 11 lying below the filter element packet 15 has a quadratic bottom opening 12, the cross section of which corresponds to the total cross section of the filter element packet 15 and which is tightly closable by a correspondingly large bottom flap 13. Accordingly, the entire cross section of the turbid liquid chambers B is exposed toward the bottom by opening the bottom flap 13.

Filter cakes C of deposited filter-aiding agent and filtered-off dirt or contamination (FIG. 2) form during the filtering process in the turbid liquid chambers B on the turbid sides of the filter elements 16. After termination of the filtering process, these filter cakes C are to be dislodged, pressed-off, or otherwise separated from the filtrate side thereof, for example with compressed air, so that the separated filter cakes C in the turbid liquid chambers B can drop through the opened bottom flap 13 into the catching container 47. To separate with compressed air, the filtrate chambers A are preferably connected to a compressed-air supply container 50 by compressed-air pipes 27 and a compressed-air valve 29. The compressed air supply container can, for example, have a volume which is approximately 10% of the volume of the filtrate chambers A and is charged with an air pressure of approximately 10 bar. The compressed-air valve 29 is preferably embodied as a pneumatically controlled valve with a very short opening time of 0.02 to 0.03 seconds. By opening the pressure-air valve 29 during this short opening time, the compressed air supply container is momentarily emptied, and a pressure cushion of approximately 0.1 to 0.2 bar is built up in the filtrate chambers A. This low pressure of the pressure cushion is sufficient to press the filter cakes C from the filter elements 16, and the brief impulse-like build-up of the pressure cushion, and the likewise brief relieving of the pressure cushion in the turbid liquid chambers B, avoids a greater subsequent flow of air and consequently precludes a breaking apart or whirling of the pressed-off filter cakes. The air relieved in the chambers B escapes downwardly through the open bottom flap 13, and preferably in addition upwardly through the opened relief valve 25. For the purpose of improving the knocking-off of the filter cakes C as a unit, the filter elements 16, approximately in the middle of the layer thickness thereof, contain a closed plate 9 which extends as far as to the vertical edge surfaces and subdivides the filter elements 16 into two fabric layers (FIGS. 2 and 3). Both of these fabric layers, by several embedded horizontal separating strips 14 and possibly still further by an embedded central vertical separating strip 14, are subdivided into several partial fields or areas which are open toward the filtrate chambers A along the edge surfaces of the filter elements 16. Thus, the relieving of the pressure cushion is distributed over the partial fields of the fabric layers, and accordingly a knocking-off of the filter cakes from the turbid side of the filter elements 16 in an as uniform and as simultaneous as possible manner is attained. Expediently, the coarse-mesh base fabric 19 of the filter elements 16 is covered with a textile or braided fabric 20 of finer mesh. To preclude a penetration of the kieselguhr, used as filtering aid agent during a filtration period, into the pores of the filter elements 16, and for the purpose of improving still further the detaching of the filter cakes C from the filter elements 16, advantageously prior to the introduction of the turbid liquid to be filtered with the added kieselguhr, there is formed a thin blocking layer of a fiber material upon the filter elements 16; this is done by depositing a fiber suspension prepared in the preparation container 2. The preparation container 2 has a paper supply roll 7 of a suitable filter paper, and a feeding roller 36 with which a predetermined length of the paper web is introduced into the preparation container 2 filled with water or clear liquid. Furthermore, the preparation container 2 is provided with a stirring mechanism 35 having knife-like sharp stirring blades with which the introduced paper web is torn apart and mixed with the water. Preferably, the volume of the preparation container 2 or of the fiber suspension prepared therein corresponds to the volume of the turbid liquid chambers B of the filter container 10, and such a quantity of fiber material in the form of the paper web is introduced into the preparation container 2 as is necessary for the formation of the predeposited thin blocking layers upon all filter elements 16.

The operation of the illustrated deposit-filtering apparatus or the filtering method using this inventive apparatus occurs in an automatically controllable manner by means of a suitable control mechanism not illustrated in detail.

The depositing valve 41 is opened and the depositing pump 5 is turned on with the filtrate valve 31 and the return valve 38 being closed. The prepared fiber suspension is conveyed from the preparation container 2 through the suspension conduit 42 into the filter container 10 until the turbid liquid chambers B of the filter container 10 (vented by the float valve 26) have filled completely with fiber suspension, whereby also the filtrate chambers A fill with clear water of the fiber suspension. The float valve 41 is thereafter closed, the float pump 5 is turned off, and the return or check valve 38 is opened. The filtrate chambers A empty quickly by way of the filtrate conduit 37 into the preparation container 2; in so doing, uniformly thick and uniformly dense blocking layers of fiber material separate or deposit upon the filter elements 16. By once again turning-on the float or deposit pump 5, the water which has returned or flowed back into the preparation container 2, together with a possible remainder of fiber suspension in the preparation container 2 is pumped into circulation through the filter container 10 in order hereby to compact or make more dense the pre-deposited thin blocking layers on the filter elements 16, and to increase the bonding of the blocking layers to the filter elements.

The depositing procedure is terminated, by turning off the depositing pump 5 and by closing the valves 41 and 38, when a small pressure rise occurs during the pre-depositing of the fiber material; now by opening the turbid liquid valve 44 and by turning-on the operating pump 6, a conversion to filtration of the turbid liquid can be accomplished. The turbid liquid is suctioned from the buffer tank 4, into which the replacement of turbid liquid occurs by way of the float valve 48, and in which the kieselguhr solution from the kieselguhr container 3 is added continuously in dosed quantity to the turbid liquid. The filtrate valve 31 is opened and the filtered liquid is discharged by way of the conduit 32 and the separator 34. The filter cakes C grow on the filter elements 16 during the filtering process; these filter cakes comprise the predeposited fibrous blocking layer, the continuously deposited kieselguhr, and the filtered-off impurities. During the filtering process, there is prepared in the preparation container 2 a subsequent fiber suspension for the subsequent filter membrane exchange.

As soon as a certain rising pressure is indicated at the manometer of the filter container 10, the filtering cycle is considered to be terminated. The operating pump 6 is turned off. The compressed air valve 30 is opened and compressed air is introduced into the filter container 10 through the compressed air pipe 28; this compressed air first pushes the turbid liquid in the turbid liquid chambers B back into the buffer container 4 through the still open valve 44. As soon as the chambers B and the prechamber 43 have been emptied, the float switch 40 responds and closes the valve 44. The compressed air now flows through the filter cakes and drives out the liquid still contained therein as filtrate, as a result of which the moisture content of the filter cakes is lowered. The compressed air then flowing into the filtrate chambers A is blown into the environment by way of the air withdrawal pipe 33 of the separator 34.

After termination of this operation, the filtrate valve 31 is closed. The bottom flap 13 is swung open so that the turbid liquid chambers B of the filter element packet 15 are completely open downwardly. Furthermore, the relief valve 25 is open. Now the compressed air valve is opened during the described brief opening time, so that the compressed air supply container 50, which is under the described air pressure, empties in a shock-like manner by way of the compressed air pipes 27 into the filter container 10, and so that the mentioned air cushion builds up in a pulse-like manner in the filtrate chambers A. The air cushion is relieved spontaneously in this short time through the fabric layers of the filter elements 16 into the chambers B, and thus presses the filter cakes C away from the filter elements 16 and into the chambers B, from where they drop down freely and unhindered through the open bottom flap 13 into the collecting container 47. The relieved air escapes from the chambers B through the bottom opening 12 and through the relief valve 25. The knocked-off filter cakes C impact upon each other with their dirty sides, and without engaging the fabric surfaces of the filter elements 16 drop from the chambers B, so that the fabric surfaces remain completely clean and a cleaning of the filter elements 16 is not necessary.

The bottom flap 13 is tightly closed after the cake ejection, and the next filtering cycle can be initiated by depositing of the fiber suspension prepared in the preparation container 2.

The present invention is, of course, in no way restricted to the specific disclosure of the specification and drawings, but also encompasses any modifications within the scope of the appended claims.

What I claim is:

1. A deposit filtering apparatus for filtering turbid liquids, said apparatus comprising:
    an essentially cylindrical, vertical filter container which includes turbid-liquid chambers and a filtrate chamber;
    a first conduit for supplying turbid liquid to said turbid-liquid chambers;
    a second conduit for discharge of filtered liquid from said filtrate chamber;
    a packet of vertically arranged sieve-like, plate-shaped filter elements arranged as a removable unit in said filter container between said turbid-liquid chambers and said filtrate chamber, with said filtrate chamber surrounding the sides of said packet, said packet being closed on its four vertical sides and being tightly connected with said filter container on its upper and lower edges by means of an intermediate cover and intermediate bottom respectively, so that between said cover and bottom said filtrate chamber is separated from said turbid-liquid chambers, said filter elements being plane parallel to, and spaced from, one another to form said turbid-liquid chambers, said last mentioned chambers being open toward the top and bottom, and being tightly closed relative to said filtrate chamber by vertical spacer strips located between the vertical edges of said filter elements, with the upper and lower horizontal faces of said filter elements being tightly closed, while the vertical faces thereof are opened to said filtrate chamber between said spacer strips, that side of said filter elements facing the pertaining turbid-liquid chamber being provided with a detachable filter membrane covering formed by deposit on said element of a suspension agent which aids filtering, said filter container having a substantially flat bottom below said filter element packet, said bottom being provided with a closable quadratic opening to allow removal of filter cakes which comprise filter aiding agent and impurities and which were built up and separated from said filter elements, the cross section of said quadratic bottom opening corresponding to the entire horizontal cross section of said filter element packet; and
    a bottom flap connected to said filter container for tightly closing said quadratic bottom opening.

2. An apparatus according to claim 1, in which said filter membrane covering on said filter elements comprises a thin blocking layer, of fiber material, deposited prior to said turbid-liquid filtering, and a kieselguhr layer deposited during said turbid-liquid filtering.

3. An apparatus according to claim 1, in which said filter elements respectively contain a closed plate located approximately in the middle of the layer thickness thereof and extending to the vertical faces thereof.

4. An apparatus according to claim 3, in which said filter elements include fabric, the fabric layers arranged on both sides of said plate being subdivided by a plurality of horizontal separating strips into a plurality of partial fields which are open on the faces of said filter elements.

5. An apparatus according to claim 4, in which said filter elements also include a central vertical separating strip.

6. An apparatus according to claim 1, in which said filter elements include fabric, and which includes a compressed-air supply container, and a third conduit connecting said filtrate chamber and said compressed-air supply container and capable of being closed, the air volume and pressure of said last mentioned container being such that during shock-like relieving of the compressed air into said filtrate chamber with an empty filter container and open bottom flap, an air pressure results in said filtrate chamber and said fabric layers of said filter elements which is sufficient to knock off filter cakes from said filter elements into said turbid-liquid chambers.

7. An apparatus according to claim 6, in which said resulting air pressure is in the approximate rate of from 0.1 to 0.2 bar.

8. An apparatus according to claim 6, in which the volume of said compressed-air supply container is approximately 10% of the volume of said filtrate chamber, the air pressure in said compressed-air supply container is approximately 10 bar prior to said relieving of said compressed air into said filtrate chamber, and said third conduit is provided with a valve embodied with an opening time of approximately 0.02 to 0.03 seconds.

9. An apparatus according to claim 1, which includes: a preparation container for a fiber suspension, said last mentioned container being connected to a paper supply roll and being provided with a stirring mechanism having knife-like sharp blades for tearing up a paper web introduced into said preparation container; and a fourth conduit connecting said turbid-liquid chambers with said preparation container.

* * * * *